United States Patent
Worden et al.

(10) Patent No.: US 10,822,848 B2
(45) Date of Patent: Nov. 3, 2020

(54) DOOR PRESENTING SYSTEM AND METHOD OF OPERATING SAME

(71) Applicant: Multimatic Inc., Markham (CA)

(72) Inventors: Scott D Worden, Unionville (CA); Jeyakumar Subramaniam, Markham (CA); Andrew R Daniels, Sharon (CA); Tomasz T Dominik, Newmarket (CA); Howard Paul Tsvi Linden, Southfield, MI (US)

(73) Assignee: Multimatic Inc., Markham (CA)

( * ) Notice: Subject to any disclaimer, the term of this patent is extended or adjusted under 35 U.S.C. 154(b) by 186 days.

(21) Appl. No.: 16/083,626

(22) PCT Filed: Mar. 14, 2017

(86) PCT No.: PCT/US2017/022231
§ 371 (c)(1),
(2) Date: Sep. 10, 2018

(87) PCT Pub. No.: WO2017/160787
PCT Pub. Date: Sep. 21, 2017

(65) Prior Publication Data
US 2019/0078361 A1    Mar. 14, 2019

Related U.S. Application Data

(60) Provisional application No. 62/308,420, filed on Mar. 15, 2016.

(51) Int. Cl.
*E05F 11/00* (2006.01)
*E05C 17/20* (2006.01)
(Continued)

(52) U.S. Cl.
CPC ............ *E05C 17/203* (2013.01); *E05B 81/20* (2013.01); *E05F 15/614* (2015.01); *B60J 5/04* (2013.01); *E05Y 2900/531* (2013.01)

(58) Field of Classification Search
CPC ....... E05F 15/614; E05F 15/42; E05F 15/611; E05B 81/20; E05B 81/22; E05B 81/21;
(Continued)

(56) References Cited

U.S. PATENT DOCUMENTS 5,862,570 A * 1/1999 Lezuch ................. E05C 17/085
16/82
6,305,737 B1 10/2001 Corder et al.
(Continued)

FOREIGN PATENT DOCUMENTS

DE    102006040211 A1    3/2008
FR        2860261 A1    4/2005
(Continued)

OTHER PUBLICATIONS

Korean Provisional Rejection for Korean Application No. 10-2018-7029644 dated Aug. 30, 2019.
(Continued)

*Primary Examiner* — Chi Q Nguyen
(74) *Attorney, Agent, or Firm* — Carlson, Gaskey & Olds, P.C.

(57) ABSTRACT

A method of operating a vehicle door includes the step of pushing an unlatched door to an ajar position. The unlatched door is mechanically held in the ajar position. In one embodiment, the method is performed using a door presenting system that includes a door checker that is configured to hold a door in the ajar position. A presenting actuator is movable between retracted and extended positions. The extended position corresponds to the ajar position. A controller is configured to move the presenting actuator between the retracted and extended positions in response to a presenting signal.

20 Claims, 4 Drawing Sheets

(51) Int. Cl.
*E05B 81/20* (2014.01)
*E05F 15/614* (2015.01)
*B60J 5/04* (2006.01)

(58) Field of Classification Search
CPC . E05C 17/203; E05C 17/20; E05Y 2900/531; E05Y 2201/41; E05Y 2201/422; E05Y 2400/32; E05Y 2400/40; E05Y 2400/44; E05Y 2400/45; E05Y 2400/54; B60J 5/04
USPC ......... 49/324, 360, 340, 333, 335, 336, 337, 49/364, 281, 279, 280, 287
See application file for complete search history.

(56) References Cited

U.S. PATENT DOCUMENTS

| | | | |
|---|---|---|---|
| 6,481,056 B1 | 11/2002 | Jesse | |
| 7,688,179 B2 | 3/2010 | Kurpinski et al. | |
| 7,971,393 B2 | 7/2011 | Gao et al. | |
| 8,442,728 B2 | 5/2013 | Wagenhuber et al. | |
| 8,451,087 B2 | 5/2013 | Krishnan et al. | |
| 8,690,204 B2 | 4/2014 | Lang et al. | |
| 9,617,774 B2* | 4/2017 | Broadhead | E05F 5/06 |
| 9,771,747 B2 | 9/2017 | Seki et al. | |
| 10,392,849 B2* | 8/2019 | Xiao | E05F 3/00 |
| 10,415,280 B2* | 9/2019 | Freedman | E05C 17/206 |
| 2007/0130837 A1* | 6/2007 | Kusunoki | E05F 15/632 |
| | | | 49/460 |
| 2007/0132552 A1 | 6/2007 | Kurpinski et al. | |
| 2008/0184525 A1* | 8/2008 | Cruz | E05C 17/203 |
| | | | 16/85 |
| 2011/0266080 A1* | 11/2011 | Schmitt | E05C 17/006 |
| | | | 180/89.1 |
| 2014/0333088 A1 | 11/2014 | Lang et al. | |
| 2015/0116085 A1 | 4/2015 | Jazswik | |
| 2015/0330133 A1* | 11/2015 | Konchan | E05B 81/76 |
| | | | 296/146.4 |
| 2016/0032624 A1 | 2/2016 | Bendel et al. | |
| 2016/0052375 A1 | 2/2016 | Scheuring et al. | |
| 2016/0273255 A1 | 9/2016 | Suzuki et al. | |
| 2016/0369551 A1* | 12/2016 | Suzuki | E05F 15/77 |
| 2017/0022742 A1 | 1/2017 | Seki et al. | |
| 2017/0030737 A1* | 2/2017 | Elie | G01D 5/14 |
| 2017/0032599 A1* | 2/2017 | Elie | G06F 21/00 |
| 2017/0130490 A1 | 5/2017 | Wirths | |
| 2018/0038147 A1* | 2/2018 | Linden | B60R 25/24 |
| 2019/0352954 A1* | 11/2019 | Salter | E05B 81/76 |

FOREIGN PATENT DOCUMENTS

| | | |
|---|---|---|
| JP | 2005016252 A | 1/2005 |
| JP | 2005256313 A | 9/2005 |
| JP | 2007100342 A | 4/2007 |
| KR | 20000008208 A | 2/2000 |
| WO | 2010001350 A1 | 1/2010 |

OTHER PUBLICATIONS

Japanese Office Action for Japanese Application No. 2018-548391 dated Oct. 16, 2019.
Chinese Office Action for Chinese Application No. 201780024251.5 dated Oct. 24, 2019.
International Preliminary Report on Patentability for International Application No. PCT/US2017/022231 dated Sep. 27, 2018.
International Search Report for International Application No. PCT/US2017/022231 dated May 30, 2017.

* cited by examiner

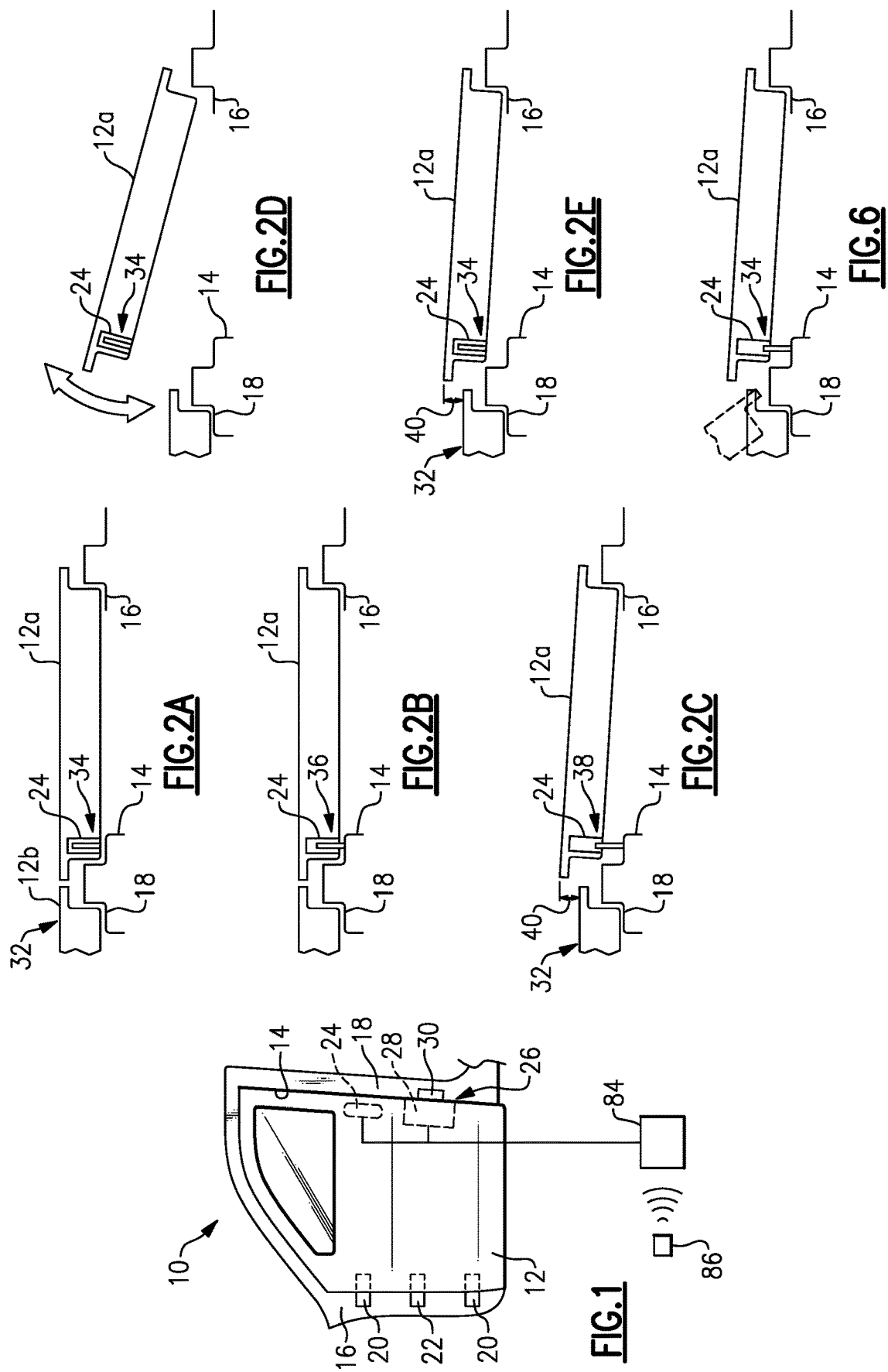

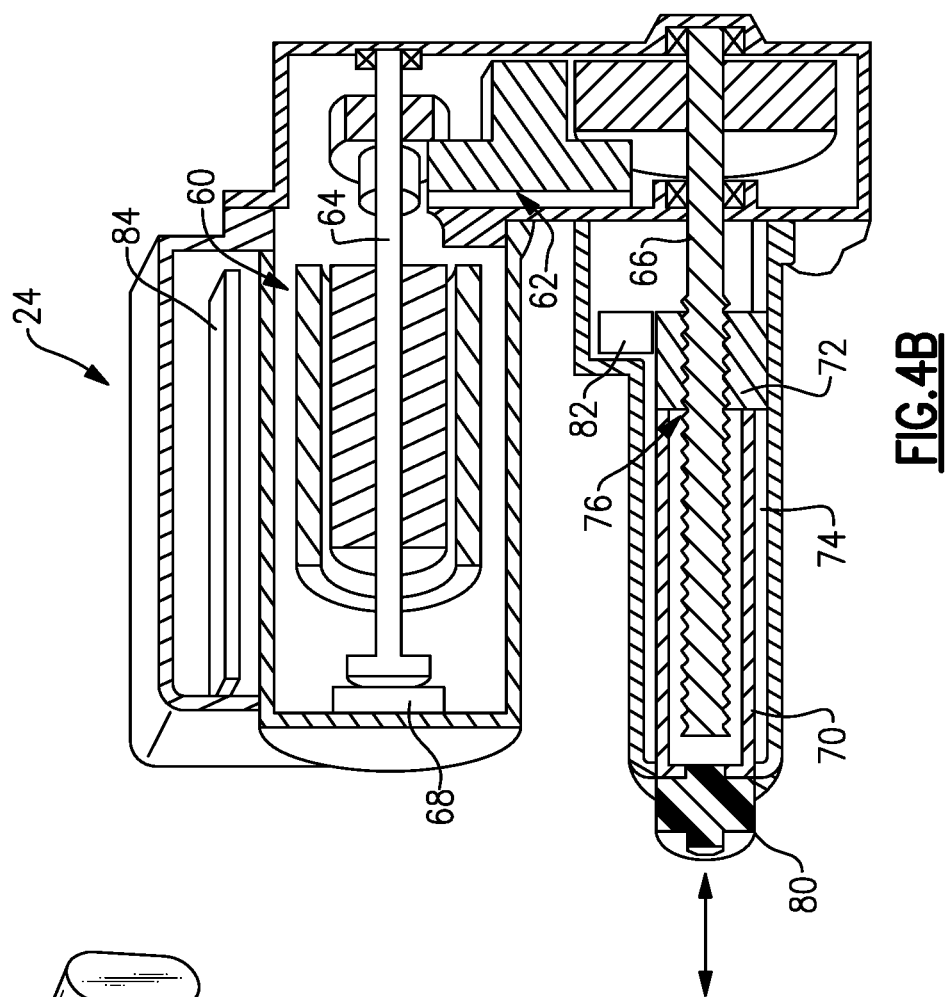
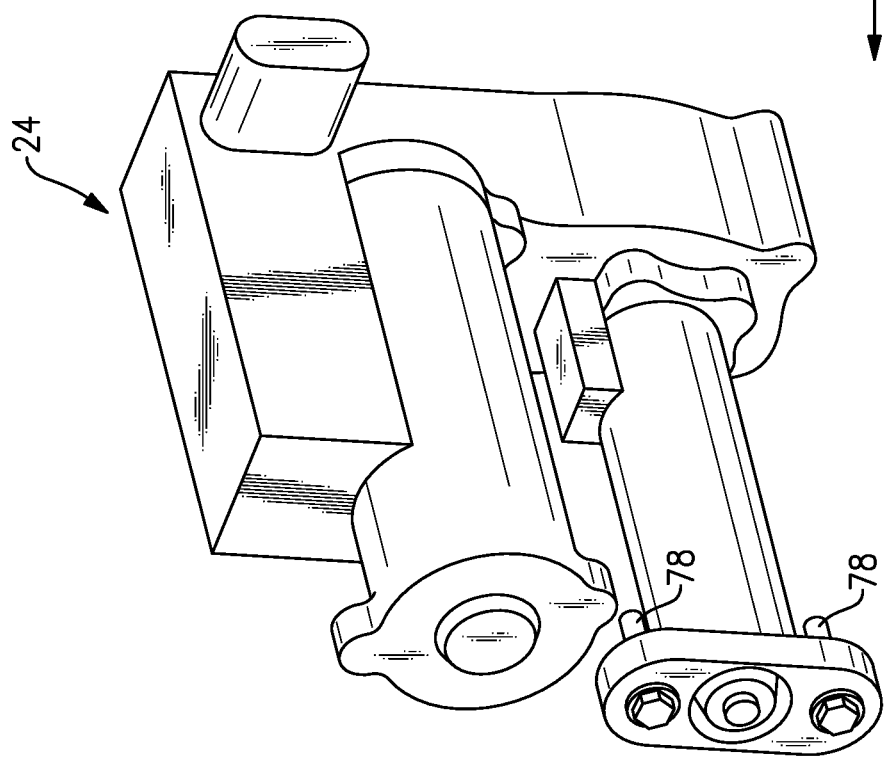

DOOR PRESENTING SYSTEM AND METHOD OF OPERATING SAME

CROSS-REFERENCE TO RELATED APPLICATIONS

This application claims priority to U.S. Provisional Application No. 62/308,420 which was filed on Mar. 15, 2016 and is incorporated herein by reference.

BACKGROUND

This disclosure relates to a door presenting system and a method of operating the same.

Basic door presenting systems have been used in the aftermarket hot rod industry for quite some time. One common hot rod feature is to "shave" the door handles, which eliminates the exterior door handles to provide a smooth, uninterrupted vehicle body line, which may be more aesthetically pleasing.

Other approaches have been used to provide a smooth vehicle body line for the purpose of reducing aerodynamic drag. For example, retracted, flush mounted exterior door handles have been provided. When the vehicle receives the appropriate signal, the exterior door handle is extended to present the handle to the user, as disclosed in U.S. Pat. No. 8,690,204 to Lang.

An exterior door handle is typically mechanically linked to the latching assembly, which releases the door from the vehicle body. In aftermarket vehicles in which the exterior door handles have been shaved, to open the door, the door latch mechanism is released remotely or otherwise. Once the door is unlatched, a spring loaded "door popper" arranged between the door and the vehicle body pushes the door ajar, which "presents" the door to the user to be opened manually by pulling on an edge of the door. One such example is manufactured by AutoLöc.

There are several drawbacks with commonly available systems. First, the door popper is continually engaged with the vehicle body, which can create squeaks and wear marks. Second, the door is not restrained in any manner. If the vehicle is in a downward orientation or canted to the side in which the door is ajar, the door may swing open uncontrollably. Finally, if a door becomes iced over in cold climate conditions, the door popper is not strong enough to present the door.

More sophisticated door presenting systems have been developed for production vehicles. In one example disclosed in U.S. Pat. No. 7,688,179 to Kurpinski, a spring loaded door popper pushes the door ajar when the door is unlatched. If the vehicle is on a decline, which may result in uncontrolled opening of the door, the door presenting feature is disabled.

Another door presenting system is disclosed in United States Publication No. 2015/0330133 to Konchan. There, an electric actuator is used to move a spring loaded lever to push the door ajar. The lever is retracted when not in use to prevent squeaks and wear. A rather complex method of sequencing the latch release and the actuator is used to present the door.

SUMMARY

In one exemplary embodiment, a method of operating a vehicle door includes the step of pushing an unlatched door to an ajar position. The unlatched door is mechanically held in the ajar position.

In a further embodiment of any of the above, the method includes a step of sensing a door presenting signal. The pushing step is performed in response to the sensing step.

In a further embodiment of any of the above, the door presenting signal is provided by at least one of a key fob, a proximity sensor, a button, a switch, a key pad, or a touch sensor.

In a further embodiment of any of the above, the mechanically holding step is performed by engaging a detent of a separate door checker.

In a further embodiment of any of the above, the mechanically holding step is performed by engaging a detent of a hinge integrated door checker.

In a further embodiment of any of the above, the ajar position corresponds to an exterior surface of the unlatched door proud of a vehicle body line with the unlatched door disposed in a door opening to obstruct the door opening and prevent occupant egress or ingress.

In a further embodiment of any of the above, the unlatched door is proud of the vehicle body line by about 3-8 cm in the ajar position.

In a further embodiment of any of the above, the method includes a step of advancing a presenting actuator from a retracted position to a preload position prior to performing the pushing step.

In a further embodiment of any of the above, the advancing step includes reaching a stall torque at the preload position.

In a further embodiment of any of the above, the pushing step includes moving the presenting actuator from the preload position to the extended position in response to detecting motion associated with the unlatched door.

In a further embodiment of any of the above, the detected motion is provided by movement of the unlatched door in response to a door seal acting on the unlatched door.

In a further embodiment of any of the above, the detected motion is provided by movement of the unlatched door in response to an actuator preloaded to act on the latched door.

In a further embodiment of any of the above, a change in motor rotational angle of the presenting actuator provides the detected motion.

In a further embodiment of any of the above, the presenting actuator includes a Hall effect sensor that reads the detected motion.

In a further embodiment of any of the above, the method includes the step of detecting a rear door in an open position and detecting a user hand in proximity to a rear end of a front door. The pushing and mechanically holding steps are performed in response to the rear door detecting step and the user hand detecting step.

In a further embodiment of any of the above, the pushing and mechanically holding steps are performed without reference to an unlatching signal.

In another exemplary embodiment, a door presenting system includes a door checker that is configured to hold a door in an ajar position. A presenting actuator is movable between retracted and extended positions. The extended position corresponds to the ajar position. A controller is configured to initiate movement of the presenting actuator between the retracted and extended positions in response to a presenting signal.

In a further embodiment of any of the above, a door includes hinges at one end and is movable between a closed position, the ajar position and an open position. The ajar position corresponds to an exterior surface of the door proud of a vehicle body line with the door disposed in a door opening to obstruct the door opening and prevent occupant egress or ingress.

In a further embodiment of any of the above, the presenting actuator is arranged at an opposite end of the one end and is mounted in the door.

In a further embodiment of any of the above, the presenting actuator is arranged at an opposite end of the one end and is mounted in a body pillar.

In a further embodiment of any of the above, the presenting actuator includes a preload position that applies a first force that is substantially less than a second force applied from the preload position to the extended position.

In a further embodiment of any of the above, the door checker is arranged at the one end and is spaced from the hinges.

In a further embodiment of any of the above, the door checker is integrated with at least one of the hinges.

In a further embodiment of any of the above, the door does not have an exterior door handle.

BRIEF DESCRIPTION OF THE DRAWINGS

The disclosure can be further understood by reference to the following detailed description when considered in connection with the accompanying drawings wherein:

FIG. 1 is a schematic view of a vehicle having a door with a door presenting system.

FIGS. 2A-2E respectively correspond to the vehicle door in a closed position and a presenting actuator in a retracted position, the vehicle door in the closed position and the presenting actuator in a preload position, the vehicle door in an ajar position with the presenting actuator in an extended position, the vehicle door in a partially open position with the presenting actuator in the retracted position, and the vehicle door in an ajar position with the presenting actuator in the retracted position.

FIG. 4A is a perspective view of an example presenting actuator.

FIG. 4B is a cross-sectional view through the presenting actuator shown in FIG. 4A.

FIG. 6 is a schematic view of an anti-pinch feature with a rear vehicle door open and a front vehicle door in the presenting position and the presenting actuator extended.

Figure 3A:
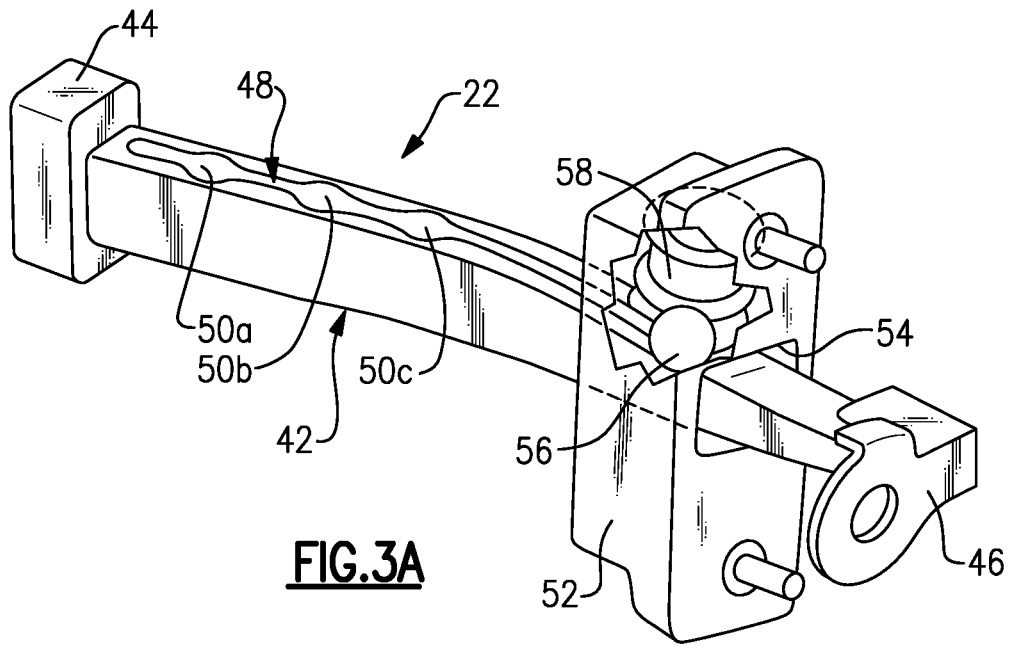
FIG. 3A is a perspective view of a separate door checker.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

A portion of a vehicle 10 is schematically shown in FIG. 14. The vehicle 10 includes a door 12 arranged within a door opening 14. In one example the door 12 has no exterior door handle. The door 12 is supported with respect to an A-pillar 16 by hinges 20. An end of the door 12 opposite the hinges 20 is secured to a B-pillar 18 by a latching assembly 26. A-, B- and C-pillars are typically referred to as body pillars. The latching assembly 26 typically includes a latch 28 carried by the door that cooperates with a striker 30 secured to the B-pillar 18. A separate door checker 22 is arranged at the hinge end of the door 12 and holds the door 12 in multiple open positions sufficiently spaced from the vehicle 10 to permit egress and ingress of the occupant through the door opening 14.

A controller 84 communicates with the presenting actuator 24 and the latching assembly 26 during various opening and closing operations. An opening device 86 communicates with the controller 84 and, when initiated, produces a door presenting signal that is sent to the controller to move the door 12 from a closed position (FIG. 2A) to a presenting position (FIG. 2C) in which the door is slightly ajar. In this ajar position, the door is unlatched from the vehicle and an occupant can manually move the door to an open position. In one example, the opening device 86 may be at least one of a key fob, a proximity sensor, a button, a switch, a key pad or a touch sensor that is part of a Passive Entry Passive Start (PEPS) system, such as described in U.S. Pat. No. 8,451,087 to Krishnan. A PEPS system generates a passive entry portable device present signal, which is indicative of a user being in close proximity to the vehicle.

Operating positions of the disclosed door presenting system are shown in FIGS. 2A-2E with the door in various positions. Referring to FIG. 2A, a front door 12a is shown in a closed position such that a smooth, uninterrupted vehicle body line 32 is provided along the side of the vehicle and with a rear door 12b in the closed position. With continuing reference to FIG. 2A, the presenting actuator 24 is in a retracted position 34 prior to receiving a door passive entry portable device present signal or presenting signal. A presenting signal may also be provided without a PEPS system.

In response to detecting a presenting signal, the presenting actuator 24 is moved to a preload position 36 with the door 12a remaining in the closed position, as shown in FIG. 2B.

Once door motion is detected, the presenting actuator 24 is moved to an extended position 38, as shown in FIG. 2C, causing a rear edge of the door 12a to move a distance 40 so that the door is slightly ajar. In one example, the distance 40 is in a range of 3-8 cm, and in another example, about 6 cm. In this position, the rear hem of the door 12a can be grabbed by a user to manually open the door. It should be understood that with the door 12a in this ajar position, the exterior surface of the door 12a is proud of the vehicle body line but still obstructs the door opening 14 to prevent occupant egress or ingress.

When the presenting sequence has been completed, the presenting actuator 24 is returned to the retracted position 34, as shown in FIG. 2E. The presenting actuator 24 remains in the retracted position 34 when the door 12a is opened or closed, as shown in FIG. 2D.

Figure 3B:
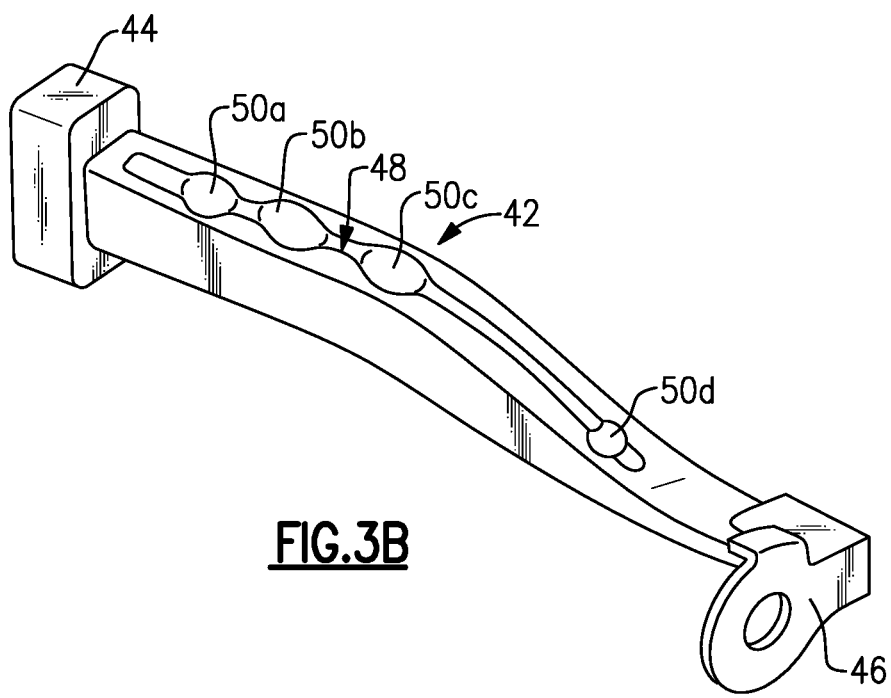
FIG. 3B is a perspective view of a check strap of the door checker shown in FIG. 3A.

The door checker 22 is shown in more detail in FIGS. 3A and 3B. Referring to FIG. 3A, a check strap 42 is received in a housing 52. A stop 44 is provided at one end of the check strap 42 to limit the travel of the door 12a in the fully open position. The other end of the check strap 42 includes a clevis 46 that is typically secured to the A-pillar 16.

A separate door checker 22, for example, as described in U.S. Pat. No. 5,173,991 to Carswell, is conventionally used at each vehicle door to hold the door in one or more discrete open positions. The check strap 42 includes a groove 48 providing a profile. The groove 48 includes multiple depressions or pockets 50a-50c that correspond to these discrete door open positions known in the art as detent positions. The check strap 42 extends through a window 54 in the housing 52. A ball 56 is biased into engagement with the groove 48 by a spring 58. Typically another ball and spring are arranged on the other side of the check strap 42, which has a corresponding groove. These spring loaded balls provide sufficient holding force when seated in a pocket.

Referring to FIG. 3B, the pockets 50a-50c correspond to typical door open positions in which an occupant can enter or exit the vehicle through the door opening. A new pocket 50d is provided in the groove 48 to correspond to the door presenting/ajar position shown in FIGS. 2C and 2E, which provides the desired distance 40. The door hold position provided by the pocket 50d prevents the door from uncontrollably swinging open if the vehicle is on a decline or canted while unlatched from the vehicle. Other door checker configurations including hinge integrated door checkers (i.e., co-located with or part of one of the hinges) can be used to perform this function providing that a detent is added at the door ajar position. One such example door hinge with integrated door checker is U.S. Pat. No. 6,481,056 to Jesse.

The presenting actuator 24 is shown in more detail in FIGS. 4A-4B. It should be understood that the presenting actuator 24 could also be incorporated into the latch assembly 26 if desired rather than provided as a stand-alone unit as shown. Fasteners 78 are provided on the presenting actuator 24 to secure the presenting actuator 24 to the door 12. In one example, the presenting actuator 24 includes an electric motor 60 that linearly drives a spindle 70 via a gearbox 62, as shown in FIG. 4B. A pliable face 80, for example, rubber, is supported at one end of the spindle 70 for engaging the A-pillar in the preload and extended positions (FIGS. 2B and 2C). This configuration can also be reversed with the presenting actuator mounted in one of the body pillars such that the actuator pushes on the door.

In one example, the controller 84 is arranged within the actuator housing. The electric motor 60 is configured to rotationally drive a first shaft 64 connected to the gearbox 62. A Hall effect sensor 68 is configured to detect rotation of the first shaft 64 in the example, but door motion may be detected using other techniques. The gearbox 62 is configured to rotationally drive a second shaft 66. A collar 72 is mounted to the spindle 70 and is configured to ride along a slot 74 in the actuator housing to prevent rotation of the collar 72. A threaded interface 76 is provided between an inner diameter of the collar 72 and an outer diameter of the second shaft 66 such that the spindle 70 translates along the second shaft 66 as it is rotationally driven. A sensor 82 is configured to detect the fully retracted or home position of the spindle 70 during operation.

Figure 5:
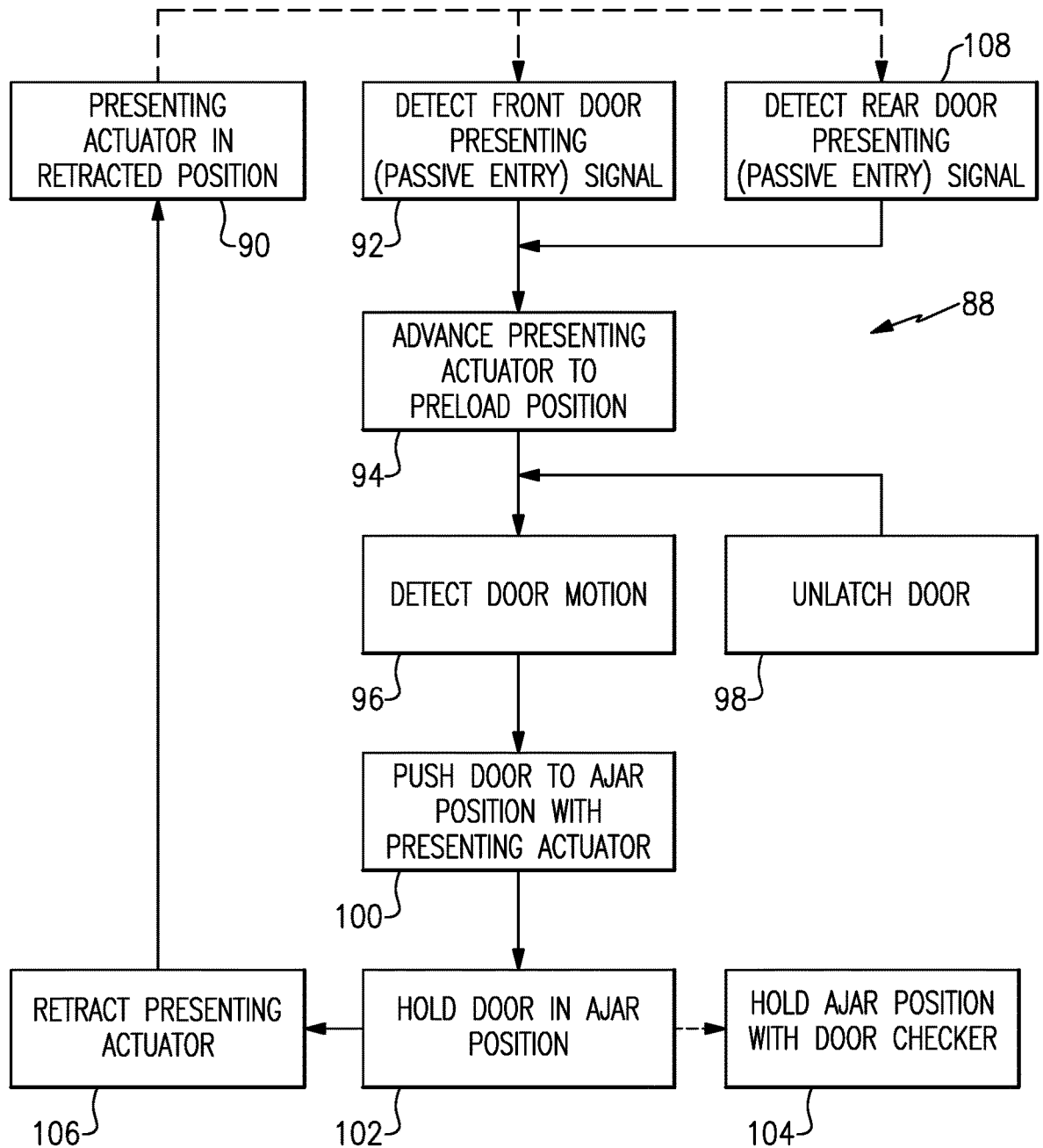
FIG. 5 is a flow chart depicting an example method of operating the door presenting system.

Referring to FIG. 5, a method 88 of operating a door presenting system includes the step of detecting a presenting signal, which may be a front door presenting signal (block 92) or rear door presenting signal (block 108). With the door closed and prior to receiving the presenting signal, the presenting actuator 24 is in the retracted position, as indicated in block 90 and shown in FIG. 2A.

In response to the controller 84 receiving the presenting signal, the spindle 70 in the presenting actuator 24 is advanced to the preload position in which the pliable face 80 abuts the A-pillar 16, as indicated in block 94 and shown in FIG. 2B. In this preload position, the electric motor 60 can be driven by a low voltage pulse modulation signal until the motor stalls. In the preload position, the spindle 70 applies around 10 N of force.

The low voltage pulse modulation signal to the electric motor 60 is maintained. Once door motion is detected, as indicated at block 96, the door presenting actuator 24 pushes the door to the ajar position, as indicated at block 100 and shown in FIG. 2C. In one example, the door motion is detected once the latching assembly 26 is actuated to unlatch the door (block 98). In particular, the weather seal between the door 12 and the vehicle body is compressed with the door closed. When the door 12 is unlatched, the weather seal expands, which slightly opens the door 12. In a further example even if the resilient weather seal does not exert enough force to slightly open the door the 10 N preload from the actuator will do so. The door motion can be detected, for example, by the Hall effect sensor 68 since the electric motor 60 starts to rotate as the spindle 70 advances with the door now starting to be spaced from the vehicle body. In this manner, complex sequencing of the latching assembly and the presenting actuator is avoided since the unlatching signal need not be coordinated with the signal to the presenting actuator 24.

With the door motion detected, greater voltage is applied to the presenting actuator 24 to generate up to 450 N of force, for example, to produce a predetermined door velocity profile. This large amount of force, sufficient to break ice around the perimeter of the door 12 if required, is generated by the torque multiplication provided by the gearbox 62. The door 12 is pushed open (block 100) until the now unlatched door 12 is mechanically held in the ajar position (block 102), for example, by the door checker (block 104). In the example, the balls 56 are seated in the pockets 50d of the check strap 42. The door checker feature in the presenting position may instead be integrated into a door hinge if desired. At the end of the door presenting sequence, the spindle 70 is retracted (block 106) to prevent wear due to the contact with the pliable face 80 as well as permit over-slam of the door 12 during closing as shown in FIG. 2E.

The above-described door presenting system and method of operation provides a perceived high quality door motion by providing a smooth door velocity profile, which is difficult to achieve using complex sequencing based upon latching assembly state.

The door presenting system also includes an anti-pinch feature since using such a system invites users to place their hands at the rear of the door, for example, the front door, during operation. If the rear door is detected in an open position and presence of a hand is detected, by, for example, a capacitive sensor or a pinch strip commonly used in automotive applications, the front door is moved to the presenting position in the manner described. As a result, a larger gap occurs at the rear of the front door and reduces the possibility of fingers becoming pinched at the rear door/front door gap, as shown in FIG. 6.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method of operating a vehicle door comprising the steps of:
providing a door presenting signal;
unlatching the door;
detecting motion associated with the unlatched door;
pushing the unlatched door to an ajar position with a presenting actuator in response to the detected motion associated with the unlatched door, wherein the ajar position corresponds to an exterior surface of the unlatched door proud of a vehicle body line with the unlatched door disposed in a door opening to obstruct the door opening and prevent occupant egress or ingress; and
mechanically holding the unlatched door in the ajar position with assistance from the presenting actuator.

2. The method according to claim 1, wherein the door presenting signal is provided by at least one of a key fob, a proximity sensor, a button, a switch, a key pad, or a touch sensor.

3. The method according to claim 1, wherein the mechanically holding step is performed by engaging an arm of a door checker.

4. The method according to claim 3, wherein the mechanically holding step includes engaging the arm with a detent.

5. The method according to claim 1, wherein the mechanically holding step is performed by engaging a detent of a hinge integrated door checker.

6. The method according to claim 1, wherein the unlatched door is proud of the vehicle body line by about 3-8 cm in the ajar position.

7. The method according to claim 6, wherein the pushing step includes moving the presenting actuator from the preload position to the extended position in response to detecting motion associated with the unlatched door.

8. The method according to claim 7, wherein the detected motion is provided by movement of the unlatched door in response to a door seal acting on the unlatched door.

9. The method according to claim 7, wherein the detected motion is provided by movement of the unlatched door in response to a preloaded actuator acting on the unlatched door.

10. The method according to claim 7, wherein a change in motor rotational angle of the presenting actuator provides the detected motion.

11. The method according to claim 7, wherein the presenting actuator includes a Hall effect sensor that senses the detected motion.

12. The method according to claim 1, comprising a step of advancing the presenting actuator from a retracted position to a preload position prior to performing the pushing step.

13. The method according to claim 12, wherein the advancing step includes reaching a stall torque at the preload position.

14. The method according to claim 1, comprising the steps of detecting a rear door in an open position, detecting a user hand in proximity to a rear end of a front door in a latched position, wherein the pushing and mechanically holding steps in relation to the front door are performed in response to the rear door detecting step and the user hand detecting step.

15. The method according to claim 1, wherein the pushing and mechanically holding steps are performed without reference to an unlatching signal.

16. A door presenting system for a vehicle door, the vehicle door including hinges at one end and being movable between a closed position, an ajar position and an open position, the ajar position corresponding to an exterior surface of the door proud of a vehicle body line of a vehicle body with the door disposed in a door opening to obstruct the door opening and prevent occupant egress and ingress, the door presenting system comprising:
a door checker configured to hold the vehicle door in the ajar position;
a presenting actuator which operates in conjunction with but separately from the door checker and is movable between retracted and extended positions, the extended position corresponding to the ajar position, wherein the presenting actuator is arranged at an opposite end of the one end of the vehicle door and is mounted in one of the vehicle door and the vehicle body; and
a controller configured to move the presenting actuator between the retracted and extended positions in response to a presenting signal.

17. The door presenting system according to claim 16, wherein presenting actuator includes a preload position that applies a first force that is substantially less than a second force applied from the preload position to the extended position.

18. The door presenting system according to claim 16, wherein the door checker is arranged at the one end and is spaced from the hinges.

19. The door presenting system according to claim 16, wherein the door checker is integrated with at least one of the hinges.

20. The door presenting system according to claim 16, wherein the door does not have an exterior door handle.

* * * * *